United States Patent [19]

Kitahara

[11] Patent Number: 5,264,686
[45] Date of Patent: Nov. 23, 1993

[54] INFORMATION RECORDING/REPRODUCING APPARATUS FOR AN INFORMATION RECORDING CARD

[75] Inventor: Toshihiro Kitahara, Tokyo, Japan
[73] Assignee: Olympus Optical Co., Ltd., Tokyo, Japan
[21] Appl. No.: 798,507
[22] Filed: Nov. 26, 1991
[30] Foreign Application Priority Data Nov. 30, 1990 [JP] Japan .................. 2-338629

[51] Int. Cl.$^5$ .................. G11B 23/00; G06K 13/06
[52] U.S. Cl. .................. 235/475; 235/483; 369/258; 360/2
[58] Field of Search .......... 369/258, 215; 360/2; 235/475, 479, 483, 485; 434/311

[56] References Cited

U.S. PATENT DOCUMENTS

| 4,140,273 | 2/1979 | Townsend et al. ........ 235/485 |
| 4,825,059 | 4/1989 | Kurihara et al. ........ 235/485 |
| 4,861,974 | 8/1989 | Kondo et al. ........... 235/475 |
| 5,017,764 | 5/1991 | Hashimoto et al. ....... 235/454 |

FOREIGN PATENT DOCUMENTS

| 0178580 | 11/1982 | Japan ........... 235/475 |
| 63-7533 | 1/1988 | Japan . |
| 1-123357 | 7/1989 | Japan . |

OTHER PUBLICATIONS

Yuko Kobayashi, et al., "Behavior of Cards on Insertion to and Removal from Roller Assembly", pp. 7 and 8 with partial translation, Aug. 22, 1991.
Patent Abstracts of Japan, vol. 12, No. 240, Jul. 8, 1988, & JP-A-63032759, Olympus Optical Co., Ltd., H. Akihiko.
Patent Abstracts of Japan, vol. 13, No. 448, Oct. 9, 1989, & JP-A-01173357, Olympus Optical Co., Ltd. H. Akihiko.

Primary Examiner—Stuart S. Levy
Assistant Examiner—Paul J. Ditmyer
Attorney, Agent, or Firm—Frishauf, Holtz, Goodman & Woodward

[57] ABSTRACT

An information recording/reproducing apparatus comprises a housing having a card conveying path, a guiding mechanism for guiding one surface and one side edge of an information recording card having bisected data areas along the conveying path to permit the card to be conveyed in the conveying path, two pressing members for pressing the card against the guiding mechanism by abutting the other side edge of the card, a drive shaft for conveying the card in the conveying path, rotatable around a horizontal axis perpendicular to the conveying path and disposed in almost middle of the two pressing members, and a distance between the two pressing members being set longer than a length of the card along the conveying path.

12 Claims, 5 Drawing Sheets

INFORMATION RECORDING/REPRODUCING APPARATUS FOR AN INFORMATION RECORDING CARD

BACKGROUND OF THE INVENTION

Field of the Invention

The present invention relates to an apparatus for recording and reproducing information on and from an information recording card having a data area bisected along the card conveying direction.

Description of the Related Art

In general information recording card, the card has a data area unbisected and formed on the substantially entire surface of the card.

In recording or reproducing information on or from the card, the card is conveyed back and forth a distance that is almost the same as the length of the card and an information recording/reproducing head is moved in the direction perpendicular to the card conveying direction. There is known an information recording/reproducing apparatus which employs roller-shaped drive means to convey an information recording card. In roller-driving type information recording/reproducing apparatus, a card is loaded through an inserting slot into a card convey path of the apparatus. The loaded card has one side thereof guided by two roller-shaped guide means, and has its other side pressed by two pressing members provided at positions corresponding to the positions of the two guide means. While the card is being conveyed by the roller-shaped drive means provided between the pressing members and the guide means, information is written on or read from the card by means of an information recording/reproducing head in the direction perpendicular to the card conveying direction.

According to the conventional apparatus, when the card is carried toward the back of the apparatus, the rear end of the card will hit against the guide means and pressing member on the back side of the apparatus. When the card is carried forward of the apparatus, its front end will hit against the guide means and pressing member on the front side of the apparatus. This makes the card conveying operation unstable and will greatly affect information recording and/or reproduction.

To overcome this shortcoming and to make the apparatus compact, an information recording card having a data area bisected along the card conveying path and an information recording/reproducing apparatus which accesses only one of the bisected data areas at a time have been proposed as disclosed in Japanese Unexamined Patent Publication Nos. 63-7533 and 1-173357. This information recording/reproducing apparatus is designed to have guide means and a pressing member only on the back side of the apparatus, with no guide means and pressing member on the front side of the apparatus. According to this apparatus, information is first recorded on or reproduced from one of the bisected data areas on the information recording card, and then the card is turned front side rear and information is then recorded on or reproduced from the other data area.

Although this information recording/reproducing apparatus can ensure stable conveying of the information recording card and reduction of its size, it cannot allow for continuous information recording or reproduction on or from the bisected data areas on the information recording card.

SUMMARY OF THE INVENTION

It is therefore an object of the present invention to provide a compact information recording/reproducing apparatus which can record or reproduce information continuously on or from separated data areas on an information recording card while maintaining stable conveying of the card.

An information recording/reproducing apparatus according to the present invention comprises:

a housing having a card conveying path;

guide means for guiding one surface and one side edge of an information recording card having bisected data areas along the conveying path to permit the card to be conveyed in the conveying path;

two pressing members for pressing the card against the guide means by abutting the other side edge of the card; and drive means for conveying the card in the conveying path, having a drive shaft rotatable around a horizontal axis perpendicular to the conveying path and disposed in almost middle of the two pressing members;

a distance between the two pressing members being set longer than a length of the card along the conveying path.

With the above structure, one side edge of an information recording card having bisected data areas along the card conveying path is pressed against the guide means by one pressing member, and the card is conveyed in the card conveying path by the drive means while being guided by the guide means.

Then, that one side edge of the card is pressed against the guide means by another pressing member and the card is conveyed while being guided in the card conveying path by the guide means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 3A to 4B illustrate the positional relationship between reference rollers, pressure rollers and the rotational axis of a drive shaft, and access states of A and B areas of an optical card in the apparatus shown in FIG. 1, FIG. 3A is a top view indicating the beginning of the access range of the A area, FIG. 3B is a top view indicating the end of the access range of the A area, FIG. 4A is a top view indicating the beginning of the access range of the B area, and FIG. 4B is a top view indicating the end of the access range of the B area;

DETAILED DESCRIPTION OF THE PREFERRED EMBODIMENT

An information recording/reproducing apparatus according to one embodiment of the present invention will now be described referring to FIGS. 1 through 5.

Figure 1:
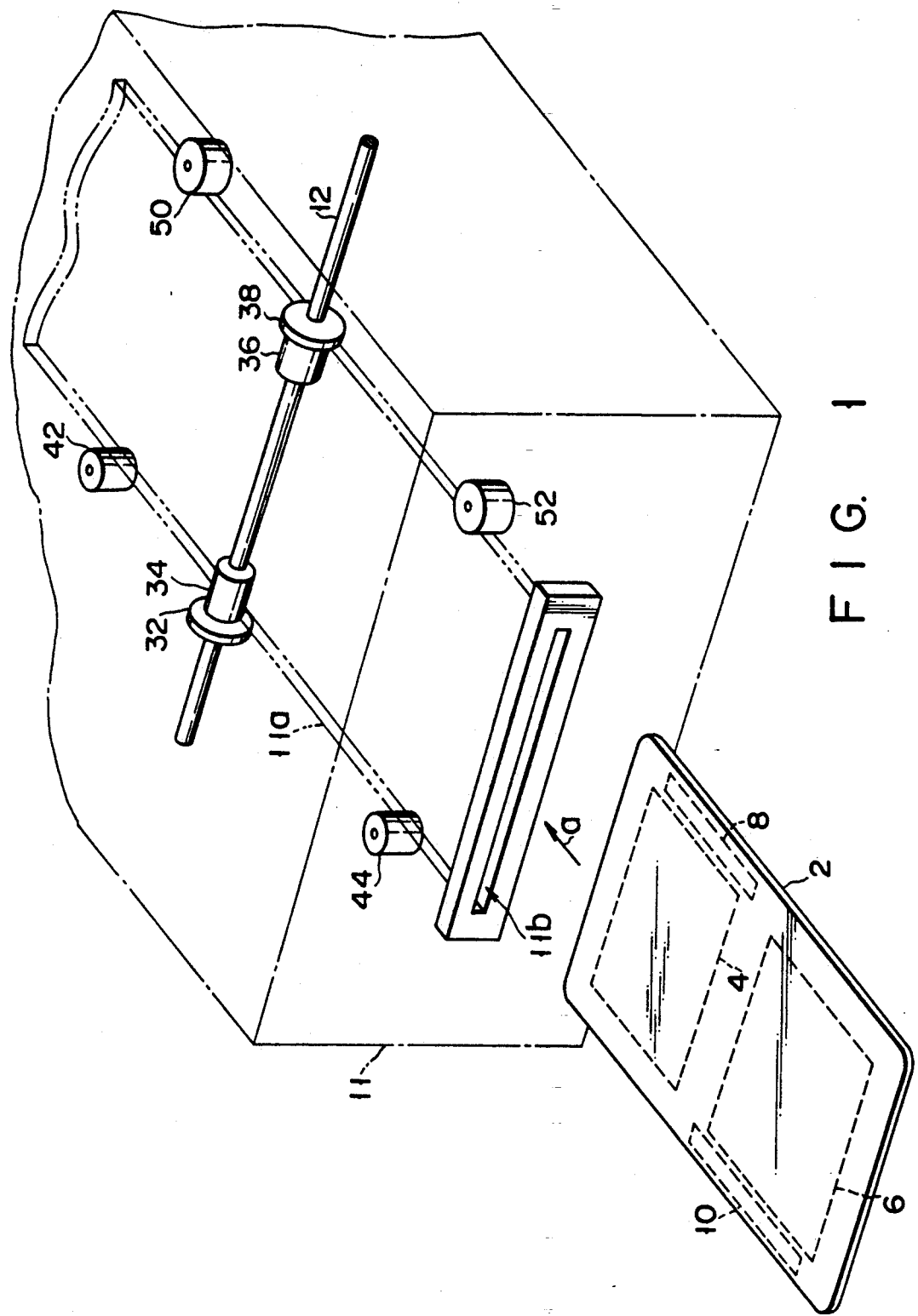
FIG. 1 is a perspective view schematically illustrating an information recording/reproducing apparatus according to one embodiment of the present invention.

An information recording card for use in an information recording/reproducing apparatus according to this embodiment, for example, an optical card 2 shown in FIG. 1 has a data area provided within the full-reflecting area formed with a predetermined width along the periphery of the optical card 2. This data area is bisected along a card conveying path 11a to be described later. The bisected data areas, an A and a B, respectively denoted by reference numerals "4" and "6."

Between the A area 4 and B area 6 is provided an ID area with a given width. A plurality of parallel tracks are formed in each of these two data areas 4 and 6 along the length of the optical card 2. An A-area accessing pattern 8 to access the data area 4 is formed on one side thereof, and a B-area accessing pattern 10 to access the data area 6 on the side thereof, both patterns on the full reflection area. These accessing patterns 8 and 10 are arranged in a point symmetrical manner with the center of gravity of the optical card 2 as the center. The reflectances of both accessing patterns 8 and 10 are set lower than those of the data areas 4 and 6, respectively.

The information recording/reproducing apparatus according to this embodiment is provided with a housing 11. In the housing 11 the aforementioned conveying path 11a along which the optical card 2 is to be conveyed is defined. A card inserting slot 11b is formed in the front wall of the housing 11 to permit the optical card 2 to be loaded into the conveying path 11a from the outside of the housing 11. The housing 11, the conveying path 11a and the inserting slot 11b are not shown in FIG. 2 for diagrammatic simplicity.

Figure 2:
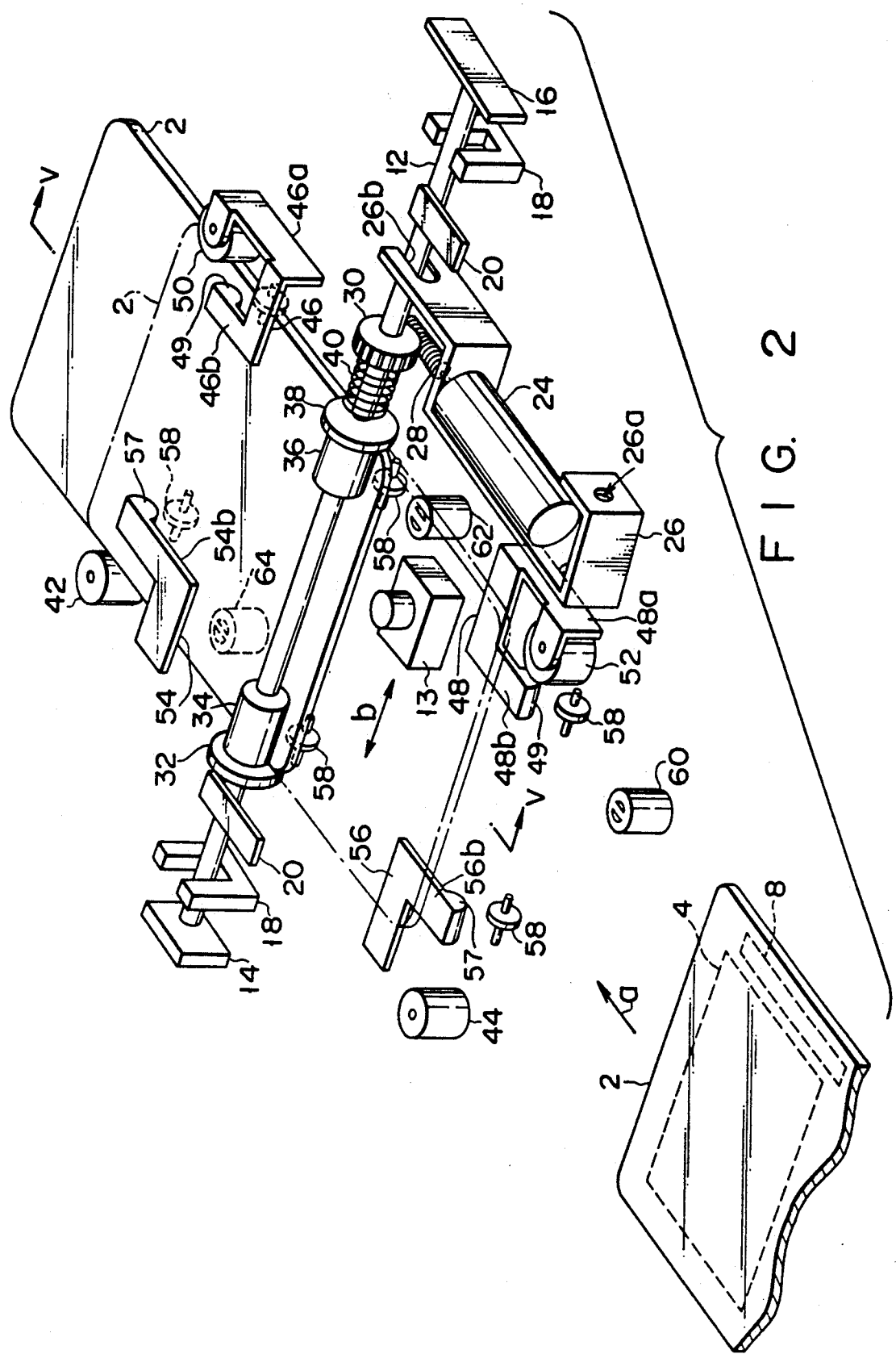
FIG. 2 is a perspective view illustrating the detailed internal structure of the apparatus in FIG. 1.

A drive shaft 12 rotatable around the horizontal axis perpendicular to the conveying path 11a is provided in approximately the center of the housing 11. As shown in FIG. 2, an optical head 13 movable in the axial direction of the drive shaft 12 or in the direction of the arrow "b" in FIG. 2 is provided below the drive shaft 12 in the housing 11. The optical head 13 constitutes an information recording/reproducing head to seek the desired tracks in each data area 4 or 6 to record and reproduce information on and from that track.

One end of the drive shaft 12 abuts against a restricting plate 14 which restricts the axial movement of the drive shaft 12, while the other end of the drive shaft 12 abuts against a first leaf spring 16 which urges the drive shaft 12 toward the restricting plate 14.

Two U-shaped guides 18 with their bottoms attached to the housing 11 and open tops are provided respectively inward of the drive shaft 12 and the restricting plate 14. The drive shaft 12 is inserted loosely in the guides 18, so that its forward/backward movement and downward movement can be restricted by the guides 18.

Two second leaf springs 20 are attached to the housing 11 respectively inward of the guides 18 to urge the drive shaft 12 downward. Inward of the right second leaf spring 20 a gear 30 which meshes with a worm gear 28 of a motor 24 is formed concentrical on the drive shaft 12.

The motor 24 is secured to the motor plate 26. As shown in FIG. 2, the motor plate 26 has a through hole 26a formed in its proximal end, with a horizontal pin (not shown) inserted in the through hole 26a. The pin is attached to the housing 11, so that the motor plate 26 can rotate around the pin.

The motor plate 26 has a notch 26b formed in the distal end, with the drive shaft 12 inserted through the notch 26b. This arrangement always ensures steady engagement between the worm gear 28 and the gear 30.

A disk-shaped fixed flange 32 and a columnar drive roller 34 are fixed concentric on the drive shaft 12 inward of the left second leaf spring 20. The fixed flange 32 constitutes part of guide means for guiding one side edge of the optical card 2.

A hold flange 38 and another drive roller 36 are provided on the drive shaft 12 inward of the gear 30. The hold flange 38 is provided to be movable in the axial direction on the drive shaft 12. The drive roller 36 is fixed to the drive shaft 12. Therefore, the drive roller 36 restricts the inward movement of the hold flange 38. The drive roller 36 is located in such a position that the optical card 2 can be conveyed while its both side edges are held between the fixed flange 32 and the hold flange 38.

The drive shaft 12 and both drive rollers 34 and 36 constitute drive means to convey the optical card 2.

Between the gear 30 and the hold flange 38 lies a coil spring 40 which urges the hold flange 38 toward the drive roller 36.

On one side of the card 2, i.e., on the left side, columnar reference rollers 42 and 44 are arranged rotatable around vertical axes. The periphery surfaces of the reference rollers 42 and 44 are in alignment with the right surface of the fixed flange 32 so that when one side edge of the optical card 2 abuts against the right surface of the fixed flange 32 the one side edge also abuts against the periphery surfaces of the rollers 42 and 44. In other words, the fixed flange 32 and reference rollers 42 and 44 constitute guide means for guiding the one side edge of the optical card 2 and are so arranged as to guide the optical card 2 in the conveying direction.

A rotational center axis 70 (FIGS. 3A to 4B) of the drive shaft 12 is provided on almost the middle position of the two reference rollers 42 and 44. The distance between the rollers 42 and 44 is determined a little longer than the length of the optical card 2 along the conveying path 11a, i.e., in the longitudinal direction.

Pressure rollers 50 and 52 are supported rotatable around the vertical axis by hold plates 46a and 48a on the right side facing the reference rollers 42 and 44. The rotational center axis 70 of the drive shaft 12 positions in the middle point of the two pressure rollers 50 and 52 as well as the reference rollers 42 and 44. The distance between these rollers 50 and 52 is set a little longer than the length of the optical card 2 in the longitudinal direction. The precise positional relationship between the reference rollers 42 and 44, the pressure rollers 50 and 52 and the drive shaft 12 will be explained later in detail referring to FIGS. 3A and 3B.

The hold plates 46a and 48a are attached to the housing 11 by fixed sections 46 and 48, respectively. A pressing plate 46b extends from the fixed section 46 backward the housing 11, while a pressing plate 48b extends forward from the fixed section 48. The hold plate 46a, the fixed section 46 and the pressing plate 46b comprise a portion of a leaf spring. In the same manner, the hold plate 48a, the fixed section 48 and the pressing plate 48b comprise a portion of a leaf spring. The top edges of the pressing plates 46b and 48b each have a well slidable protrusion 49 whose cross section is half a circle. The protrusions 49 of the pressing plates 46b and 48b press the optical card 2 downward.

On the left side of the conveying path 11a opposite to the pressing plates 46b and 48b, separate pressing plates 54b and 56b are provided whose tops each have a protrusion 57 with a good slidability and a semicircular cross section. The proximal ends of the pressing plates 54b and 56b are securely fixed to the housing 11 by fixed sections 54 and 56. The pressing plate 54b and the fixed section 54 are made of one piece of a leaf spring. The pressing plate 56b and the fixed section 56 are formed of a piece of leaf spring in the same manner.

Under the drive rollers 34 and 36 and the protrusions of the respective pressing plates 46b, 48b, 54b and 56b, six support rollers 58 are respectively placed rotatable on the horizontal axis which is parallel to the rotational center axis 70 of the drive shaft 12. The six support rollers 58 constitute guide means for guiding the bottom surface of the optical card 2.

In the above-described structure, the optical card 2 is conveyed being held by the drive rollers 34 and 36, the protrusions of the pressing plates 46b, 48b, 54b and 56b, and the six respective support rollers 58.

A card sensor 60 is located below the conveying path 11a near the slot 11b to detect the loading of the optical card 2 and activate the motor 24. An A sensor 62 and a B sensor 64 are placed below the drive shaft 12, respectively in the front of the drive roller 36 on the right side and at the back of the drive roller 34 on the left side to detect the A-area accessing pattern 8 and the B-area accessing pattern 10.

Figures 3A, 3B:
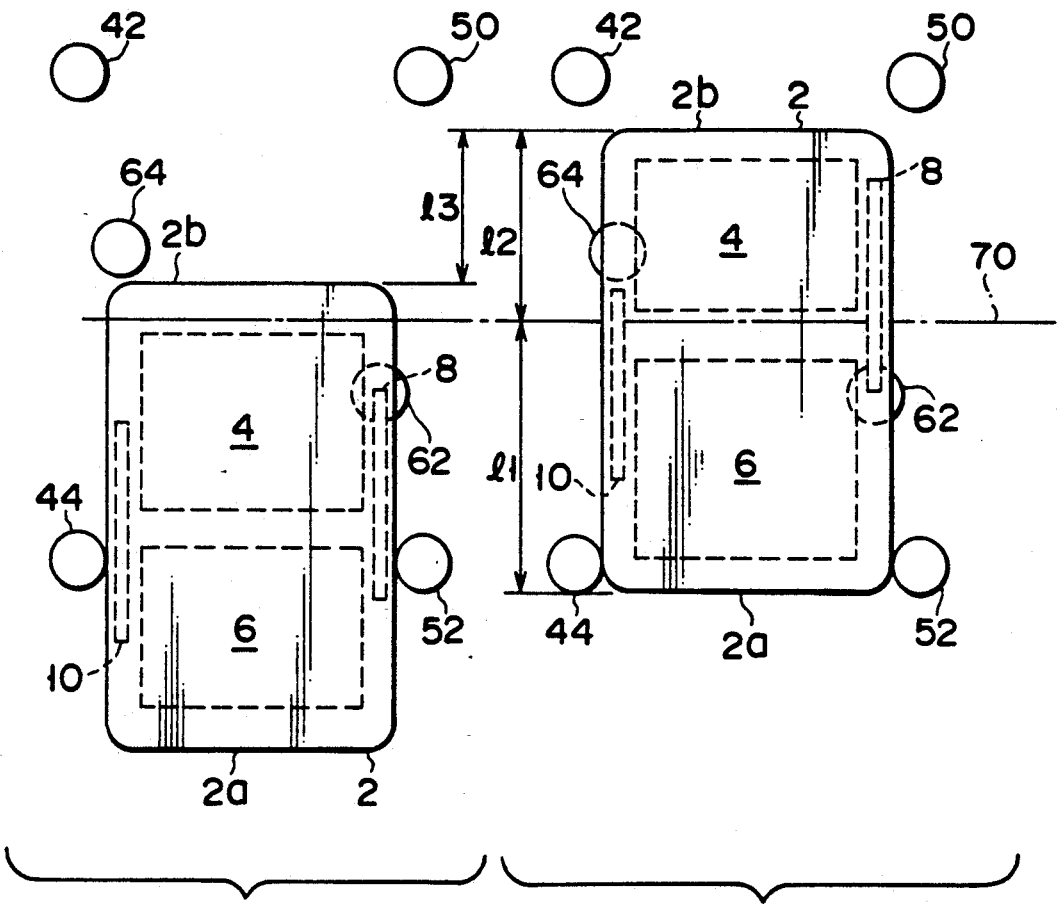

As shown in FIG. 3A, the A sensor 62 is positioned to detect the front end of the A-area accessing pattern 8 when the front end surface 2a of the optical card 2 becomes in the same level as the outer surfaces of the reference roller 44 and the pressure roller 52.

Figures 4A, 4B:
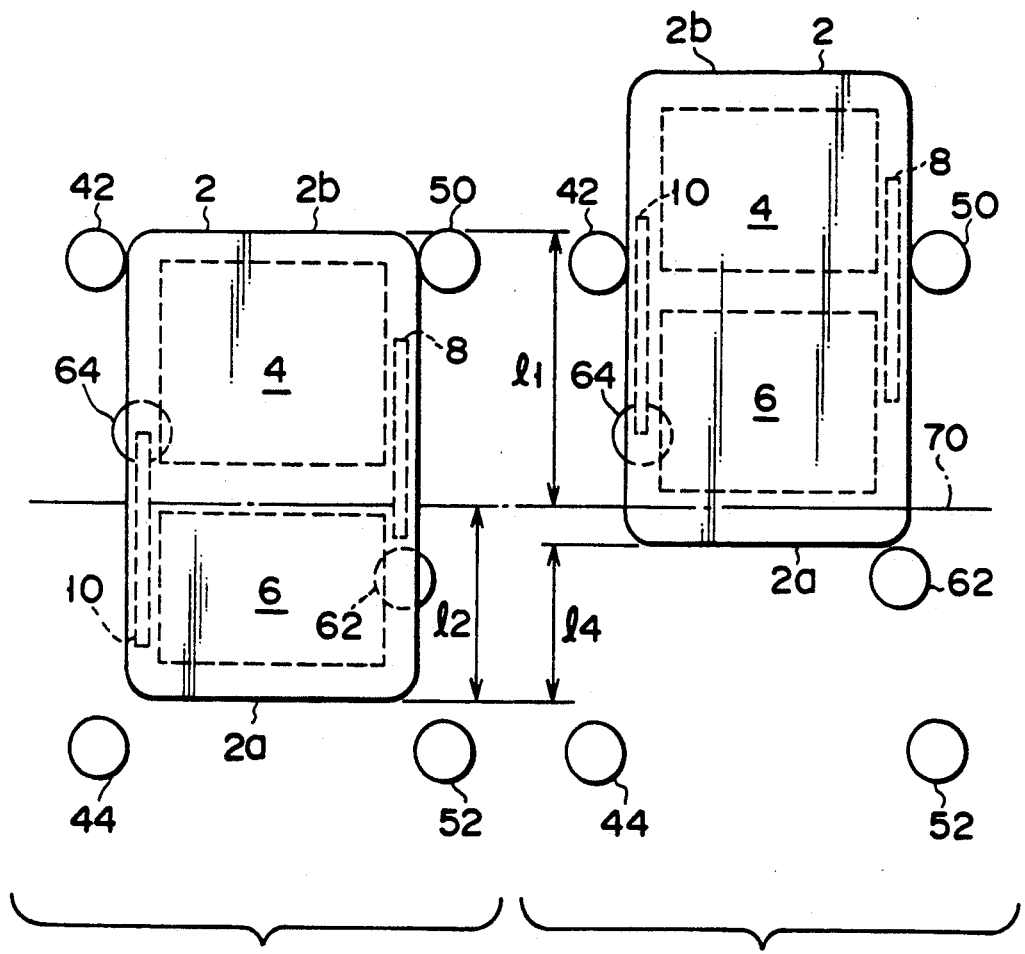
Figure 5:
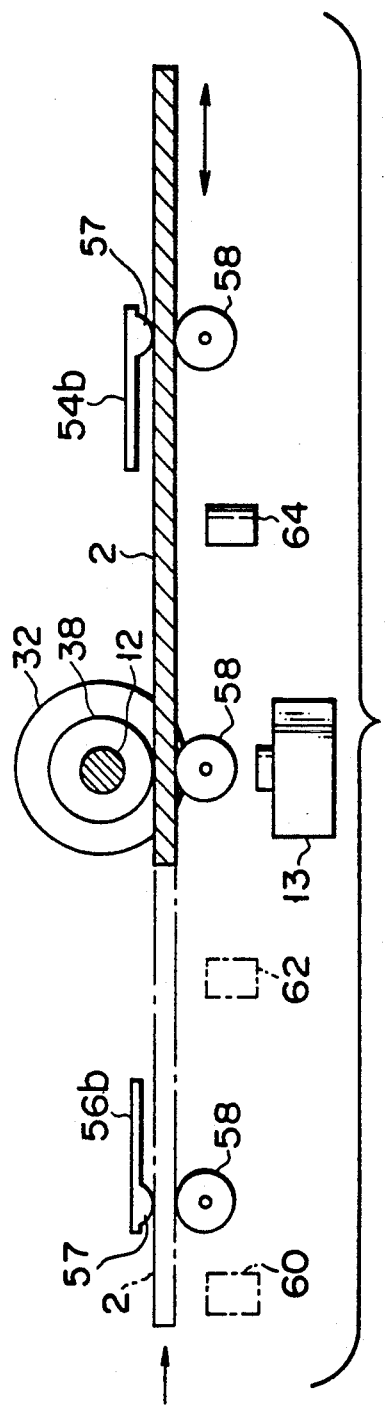
FIG. 5 is a longitudinal cross section of the apparatus in FIG. 2 taken along the V—V line, illustrating the positional relationship between the reference rollers, pressure rollers and the rotational axis of the drive shaft.

The B sensor 64 is positioned as well as the A sensor 62, to detect the rear end of the B-area accessing pattern 10 when the rear end surface 2b of the optical card 2 reaches the same level as the outer surfaces of the reference roller 42 and the pressure roller 50, as shown in FIG. 4A.

The positional relationship between the reference rollers 42 and 44, the pressure rollers 50 and 52 and the drive shaft 12 will now be explained in detail referring to FIGS. 3A to 4B.

In the FIGS. 3A and 3B, a line linking the rotational center axes of the reference roller 44 and the pressure roller 52 at the front portion of the apparatus is set parallel to the rotational center axis 70 of the drive shaft 12. The distance between the linking line of the outer surfaces of the reference roller 44 and the pressure roller 52 and the rotational center axis 70 of the drive shaft 12 is set to a length $l_1$ slightly longer than half the length of the optical card 2 in the lengthwise direction. This length combination is used also in FIGS. 4A and 4B.

A difference $l_2$ between the length of the optical card 2 and the length $l_1$ is determined longer than the access ranges $l_3$ and $l_4$ of the respective A and B areas. If the members are placed as described, the rear end surface 2b of the optical card 2 will not hit against the reference roller 42 and the pressing roller 50 while information is recorded on or reproduced from the A area 4. Further, the front end surface 2a of the optical card 2 will not hit against the reference roller 44 and the pressing roller 52 while information is recorded on or reproduced from the B area 6.

The action of this embodiment will now be described.

First, the procedures to record and reproduce information on and from the A area 4 will be described.

Referring to FIG. 1, as the optical card 2 is loaded through the slot 11b with the individual data areas 4 and 6 facing downward, the card sensor 60 shown in FIG. 2 detects the optical card 2 and the motor 24 is driven. The motor 24 rotates the drive shaft 12 via the worm gear 28 and gear 30. Both side edges of the rear portion of the optical card 2 are held between the reference roller 44 and pressure roller 52 by the pressing force of the hold plate 48a, while the top surface of the card 2 is held between the front support rollers 58 and 58 and the projections of the pressing plates 48b and 56b by the pressing force of the pressing plates 48b and 56b.

As the optical card 2 is further inserted, both side edges of the rear portion of the optical card 2 are held between the fixed flange 32 and hold flange 38 by the pressing force of the coil spring 40, and the top surface of the card 2 is held between the support rollers 58 and 58 below the drive shaft 12 and the drive rollers 34 and 36 by the pressing force of the leaf springs 20 and 20. The optical card 2 is conveyed inside the housing 11 while being guided in the conveying direction in those conditions.

As shown in FIG. 3A, when the rear end of the A-area accessing pattern 8 reaches the A sensor 62, the A sensor 62 stops the rotation of the drive shaft 12 via a predetermined circuit, and the optical head 13 reciprocates in the direction of the arrow b in FIG. 2 to seek the desired track on the A area 4. When the desired track is sought, the A sensor 62 rotates the drive shaft 12 via the predetermined circuit to convey the optical card 2 in the A area access range $l_3$, and the optical head 13 records or reproduces information on or from the desired portion on that track.

At the time of information recording or reproduction, when the optical card 2 is conveyed to the position as shown in FIG. 3B where the leading end of the A-area accessing pattern 8 reaches the A sensor 62, the A sensor 62 detects the leading end of the A-area accessing pattern 8 to stop rotating the drive shaft 12 and stops the conveying of the optical card 2.

The conveying of the optical card 2 is controlled by the A-area accessing pattern 8 and A sensor 62 in accordance with information recording or reproduction on or from the A area 4 by the optical head 13, and the optical card 2 will not hit against the rear reference roller 42 and pressure roller 50, thus ensuring stable card conveying.

Now, the procedures to record and reproduce information on and from the B area 6 will be described. The action from the insertion of the optical card 2 through the slot to the conveying of the optical card 2 while its rear end portion is held between the support rollers 58 and 58 below the drive shaft 12 and the drive rollers 34 and 36, is the same as that involved in information recording or reproduction on or from the A area 4.

Then, the side edges of the optical card 2 are separated from the reference roller 44 and pressure roller 52, and the card 2 is conveyed until the rear end of the B-area accessing pattern 10 reaches the B sensor 64, while being held between the reference roller 42 and pressure roller 50 on the rear side of the apparatus. Consequently, as shown in FIG. 4A, the B sensor 64 stops the rotation of the drive shaft 12 via a predetermined circuit, and the optical head 13 reciprocates in the direction of the arrow b in FIG. 2 to seek the desired track on the B area 6. When the desired track is found, the B sensor 64 rotates the drive shaft 12 via the predetermined circuit to convey the optical card 2 in the B area access range $1_4$, and the optical head 13 records or reproduces information on or from the desired portion on that track.

At the time of information recording or reproduction, when the optical card 2 is conveyed to the position as shown in FIG. 4B where the leading end of the B-area accessing pattern 10 reaches the B sensor 64, the B sensor 64 detects the leading end of the B-area accessing pattern 10 to stop rotating the drive shaft 12 and stops the conveying of the optical card 2.

The conveying of the optical card 2 is controlled by the B-area accessing pattern 10 and B sensor 64 in accordance with information recording or reproduction on or from the B area 6 by the optical head 13, and the optical card 2 will not hit against the front reference roller 44 and pressure roller 52, thus ensuring stable card conveying as in the case of the B area 6.

The drive shaft 12 and drive rollers 34 and 36, in cooperation with the A-area accessing pattern 8 and the A sensor 62, constitute drive means to drive the A area 4, one of the bisected data areas, and they when cooperating with the B-area accessing pattern 10 and the B sensor 64, constitute drive means to drive the B area 6, the other bisected data area.

Although the foregoing description of this embodiment has been given with reference to the apparatus which performs both information recording and reproduction, this embodiment may be applied to an apparatus which has only one of the functions. The data area has only to be divided into at least two areas, and may be divided into a greater number of areas.

Figure 6:
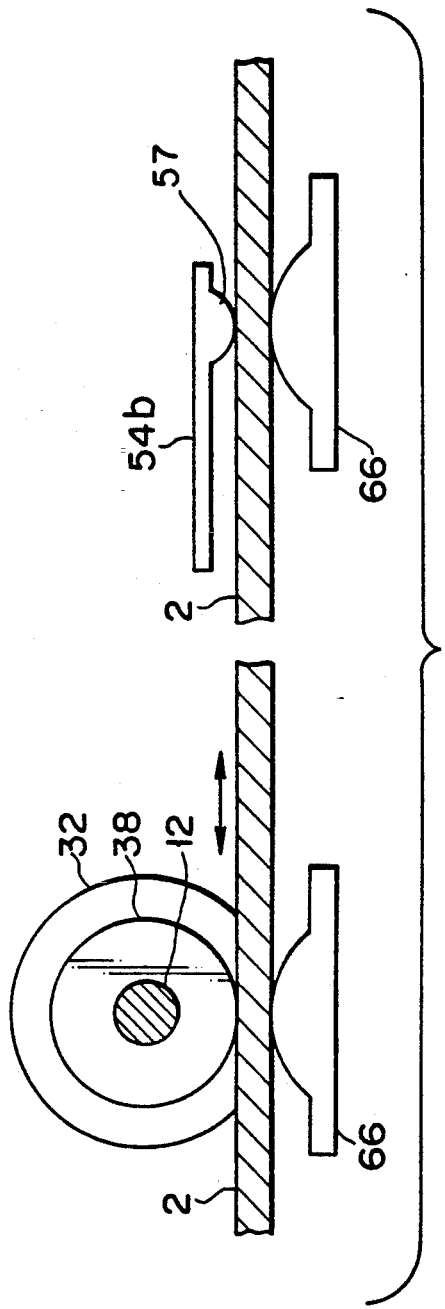
FIG. 6 is a longitudinal cross section showing a modification of a support roller.

The present invention is not limited to the above-described embodiment, but may be modified in various other manners within the scope and spirit of the invention. For instance, while the support roller 58 serves as the support member for supporting one surface of the card in this embodiment, the support member should not necessarily have the roller shape, but may take the form of a support stand 66 having an arc cross section as shown in FIG. 6. In this case, it is preferable that the support stand 66 be fixed to the housing 11 and that portion which abuts against the optical card 2 be made of a material having a good slidability.

In addition, the guide means may be constituted by a groove formed along the conveying path in a wall having a given thickness, instead of the roller type.

According to the present invention, continuous information recording or reproduction on or from divided data areas on an information recording card is possible while maintaining the compact apparatus size.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An information recording/reproducing apparatus comprising:
    a housing having a card conveying path;
    guiding means for guiding one surface and one side edge of an information recording card, having at least two data areas, said guiding means being positioned along said conveying path for conveying said card along said conveying path;
    at least two pressing members for pressing said card against said guiding means, said at least two pressing members abutting another side edge of said card; and
    drive means for conveying said card along said conveying path, said drive means comprising a drive shaft rotatable around a horizontal axis perpendicular to said conveying path, said drive shaft being disposed between said at least two pressing members;
    a distance between said at least two pressing members being set to be longer than a length of said card when measured parallel to and along said conveying path.

2. An apparatus according to claim 1, wherein said drive means further comprises at least one roller provided coaxially with and mounted on said drive shaft and secured to said drive shaft so as to be rotatable together with said drive shaft.

3. An apparatus according to claim 2, wherein each of said at least two pressing members comprises a roller rotatable around a respective vertical axis thereof.

4. An apparatus according to claim 3, wherein said guiding means comprises two rollers respectively located at a position corresponding to a respective position of one of said pressing members, said two rollers of said guiding means being rotatable around a respective vertical axis thereof, for guiding a respective side edge of said card.

5. An apparatus according to claim 4, wherein said guiding means comprises a plurality of rollers respectively positioned to be in a plane below a plane in which said conveying path is positioned, each of said plurality of rollers of said guiding means being rotatable around a respective horizontal axis that is perpendicular to said plane of said conveying path, for guiding one surface of said card.

6. An apparatus according to claim 5, further comprising:
    a motor for rotating said drive shaft; and
    detecting means for detecting two accessing patterns provided on said card in association with said two data areas, said detecting means being coupled to drive said motor.

7. An apparatus according to claim 4, wherein said guiding means includes a support stand, said support stand being positioned in a plane that is below a plane in which said conveying path is positioned.

8. An information recording/reproducing apparatus comprising:
    a card driving means including at least a plurality of convey rollers for linearly conveying a card back and forth in a first direction and a second direction opposite to said first direction, said card having at least two data areas arranged along said first direction; and a first and a second guide roller arranged such that said plurality of convey rollers are interposed between said first and second guide rollers, said guide rollers guiding said card in said first and second directions;

a spacing D between a central axis of said first guide roller and a central axis of said second guide roller being longer than a length d of said card when said card is measured in said first direction so that a relation $d < D$ exists.

9. An apparatus according to claim 8, wherein said at least a plurality of convey rollers engage first and second side edge portions of said card in another direction that is perpendicular to said first and second directions.

10. An apparatus according to claim 9, wherein said plurality of convey rollers respectively engage both an upper and a lower surface of said card.

11. An apparatus according to claim 9, wherein said first and second guide rollers are respectively positioned to engage respective first and second side edges of said card in said another direction.

12. An apparatus according to claim 8, wherein the at least two data areas are formed by bisecting a single data area in a direction perpendicular to said first and second directions.

* * * * *